No. 692,756. Patented Feb. 4, 1902.
F. S. BALDWIN.
MEASURING DEVICE.
(Application filed Nov. 26, 1901.)

(No Model.) 2 Sheets—Sheet 1.

Witnesses
Geo. E. Fuch.
Chas. R. Wright.

Inventor
F. S. Baldwin,
By A. S. Pattison,
Attorney

No. 692,756. Patented Feb. 4, 1902.
F. S. BALDWIN.
MEASURING DEVICE.
(Application filed Nov. 26, 1901.)

(No Model.)   2 Sheets—Sheet 2.

Witnesses
Geo. E. Frech.
Chas. R. Wright Jr.

Inventor
F. S. Baldwin
By A. S. Pattison
Attorney.

UNITED STATES PATENT OFFICE.

FRANK S. BALDWIN, OF NEWARK, NEW JERSEY.

MEASURING DEVICE.

SPECIFICATION forming part of Letters Patent No. 692,756, dated February 4, 1902.

Application filed November 26, 1901. Serial No. 83,740. (No model.)

*To all whom it may concern:*

Be it known that I, FRANK S. BALDWIN, a citizen of the United States, residing at Newark, in the county of Essex and State of New Jersey, have invented new and useful Improvements in Measuring Devices, of which the following is a specification.

My invention relates to improvements in measuring devices, the improvement hereinafter described and which is illustrated herein being adapted to be used with or without a tape.

The object of my invention is to provide a measure of the character hereinafter shown and described with an improved and convenient manner of "wiping out"—that is, the returning of the numeral-wheels to naught or zero after a measurement has been made, thus returning the parts of the device to their proper positions for another measurement.

Figure 1:
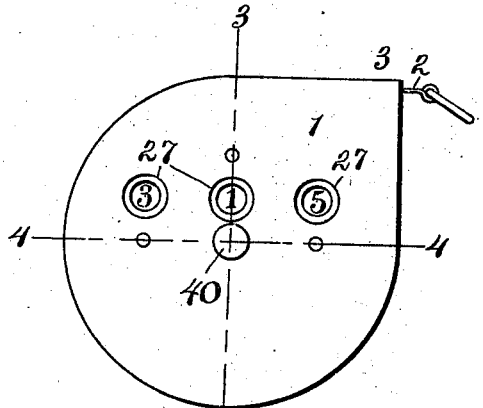
Figure 2:
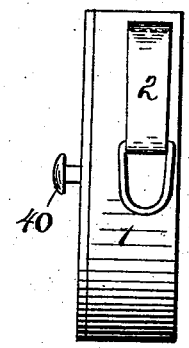
Figure 3:
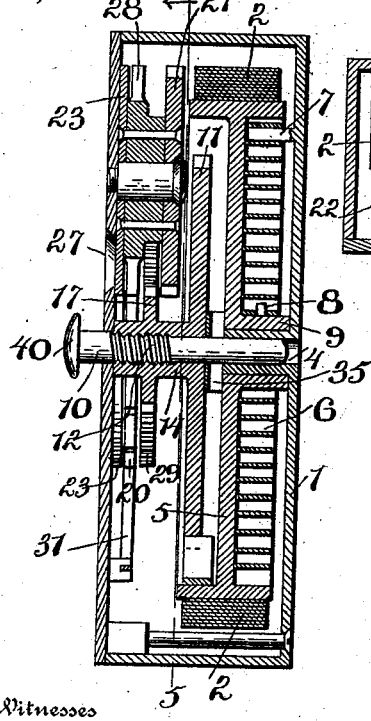
Figure 4:
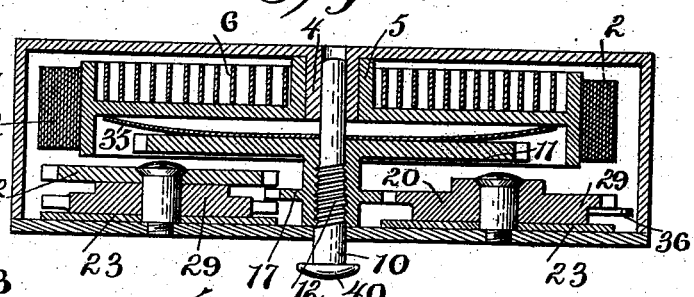
Figure 6:
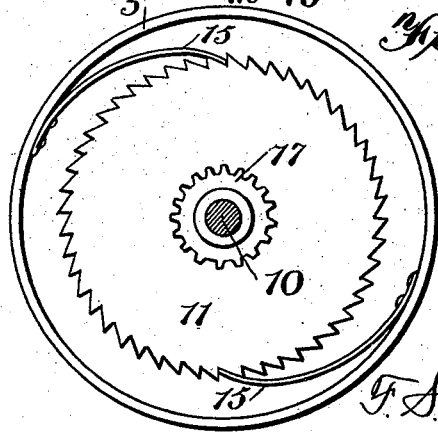
Figure 5:
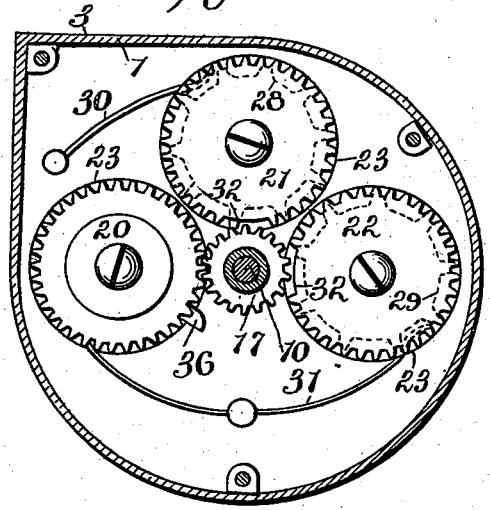
Figure 7:
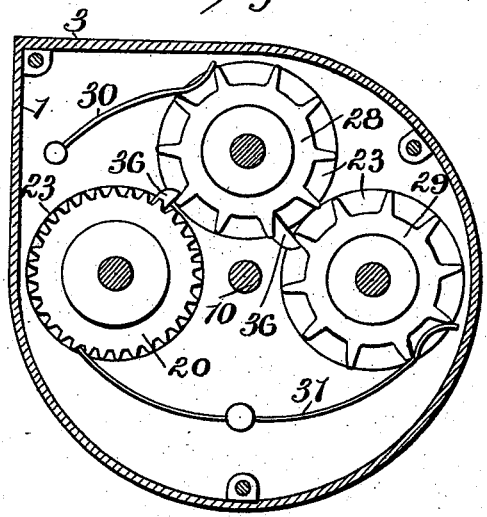
Figure 8:
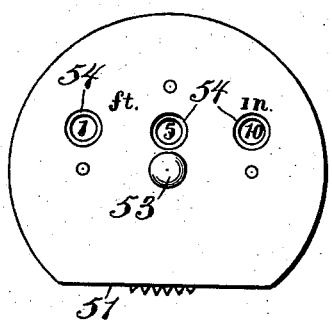
Figure 9:
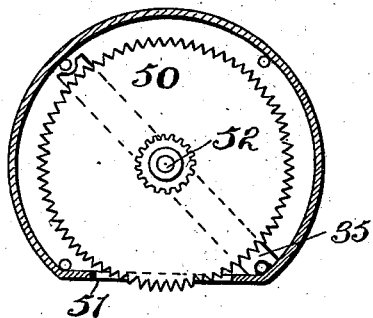

In the accompanying drawings, Figure 1 is a side elevation of my tape-measure, which includes in its mechanism my improved wiping-out construction. Fig. 2 is an edge view of the same. Fig. 3 is a transverse sectional view on the line 3 3 of Fig. 1. Fig. 4 is a sectional view at right angles to Fig. 3 and on the line 4 4 of Fig. 1. Fig. 5 is a sectional view on the line 5 5 of Fig. 3 looking in the direction indicated by arrow. Fig. 6 is a view of the reel-casing with the ratchet-wheel and its pinion shown in position in respect to the casing. Fig. 7 is a similar view to Fig. 5 with some of the gears omitted. Fig. 8 is an external plan view showing a different form of casing and the construction including my improved wiping-out mechanism, the construction arranged to operate without a tape. Fig. 9 is a sectional view omitting the numeral-gearing and showing the toothed actuating-wheel used in the place of a tape-reel.

Referring now to Figs. 1 to 7, inclusive, 1 indicates the casing, designed for use in connection with a tape 2. The casing, as shown, is arranged with a point or right-angle portion 3, and the tape 2 passes therefrom at this point, whereby it is especially well adapted for measuring in corners of rooms and similar situations to obtain accurate measurement.
One side of the casing is preferably, though not necessarily, provided with an inwardly-extending bushing 4, upon which is journaled a combined spring and reel-casing 5. This casing 5 has wound around it a suitable tape 2, preferably composed of a strip of steel. The casing is suitably journaled (preferably as shown) upon the bushing 4 and contains at one side a spring 6, one end of the spring being secured to the hub or center of the casing and the other end to the case proper. The action and operation of a spring of this form in a tape-measure are so well understood that any description thereof is unnecessary. Passing through the casing loosely is a suitable rotatable and slidable shaft 10, the said shaft 10 having connected therewith in any suitable manner a ratchet-wheel 11. As here shown, the means preferred for attaching said wheel to the shaft 10 is through the medium of engaging screw-threads, as shown at 12, formed upon the said shaft and upon a hub or bushing 14 of the ratchet-wheel. One or more springs 15 have their outer ends secured to the casing 5, while their inner and free ends are in engagement with the ratchet-wheel, whereby the rotation of the casing in one direction will cause a corresponding rotation of the ratchet-wheel—as, for instance, when the tape is drawn out for measuring—while the rotation of the casing in the opposite direction for winding up the tape will not rotate the ratchet-wheel, since the springs in this case will slip idly over the teeth of the said wheel.

Formed as a part of or secured to the hub or bushing 14 of the ratchet-wheel 11 is a pinion 17, the said pinion adapted to engage and actuate a suitable registering mechanism, which I will now explain.

As here shown, the registering mechanism consists of a units-wheel 20, a tens-wheel 21, and a hundreds-wheel 22. These wheels are geared and have each secured to them a numeral-disk 23, the numerals of which are adapted to show through the openings 27 in the case. The wheels 21 and 22 have located between them and the numeral-disk suitable toothed wheels or gears 28 and 29, and with which suitable check-springs 30 and 31 engage for a purpose well understood by those skilled in the art. The tens and hundreds wheels 21 and 22, respectively, have a portion of their teeth cut out, as shown at 32, for a purpose to be presently explained. It will be noticed by reference to Fig. 5 that the wheels 20, 21, and 22 are situated around the pinion 17, and by reference to Figs. 3 and 4 it will be noted that the tens and hundreds wheels 21 and 22 are located in a different plane, or, in other words, at a point inside of the plane in which the units-wheel 20 is located. A suitable spring 35 serves to hold the shaft 10, and consequently the pinion 17, normally in its outward position, as shown in Figs. 3 and 4. In this position the parts are ready to perform their function in registering a measurement caused by the drawing outward of the tape 2, and the pinion 17 is thus shown to be normally in engagement with the units-wheel 20. The carrying operation from the units-wheel to the tens and from the tens to the hundreds is of the ordinary and well-known form—namely, through the medium of projecting teeth or lugs 36—and as the operation of a registering-train of this character is so well understood any further explanation is unnecessary. After a calculation has been made and a register thereof obtained through the openings 27 in the case and it is desired to wipe out the calculation, or, in other words, to return the numeral-wheels to zero or naught, it is accomplished in the following manner: My invention pertains to this feature, and it consists in having the tens and hundreds wheels in the same plane and the units-wheel 20 in a different plane and the tens and hundreds wheels provided with the cut-out portion 32 and the pinion 17 movable in and out of engagement, respectively, with the units, tens, and hundreds wheels. As before stated, the pinion 17 being in normal engagement with the units-wheel the tape is drawn outward until the units-wheel is brought to naught. By pushing the shaft 10 inward through the medium of its headed or button portion 40 the pinion 17 is carried out of engagement with the units-wheels 20 and into engagement with the tens and hundreds wheels 21 and 22. The cut-out portions 32 of these wheels are so located that they are opposite the pinion 17 when the tens and hundreds numeral-wheels have their naughts exhibited through the openings 27 of the casing. Hence the units-wheel having been turned, as before stated, to bring naught through its opening, the shaft is moved inward and the tape drawn outward. The tens and hundreds wheels will then be carried to zero, since the pinion 17 cannot rotate these wheels beyond that point, because of the cut-out portions 32. From this it will be noted that it is immaterial what numerals of the wheels 21 and 22 are exhibited through the openings when the wiping-out method is being operated, for the wheels cannot be turned by the pinion 17 beyond naught or zero. In this way the operator can wipe out the calculation by first causing the units-wheel to turn to zero and pressing inward upon the button 40 and continuing to draw outward on the tape, which, as before stated, will automatically bring the tens and hundreds wheels to zero.

In Figs. 8 and 9 I have shown this invention as applicable to a measuring device in which a projecting spur-wheel 50 is substituted for the ratchet-wheel, tape, and tape reel or casing shown in Figs. 1 to 7. In this instance the ratchet-wheel 11 is converted into a spur-wheel, as shown in Fig. 9, and enlarged in diameter. The casing is then cut out, as shown at 51, to permit the spur-wheel to project. In all other respects the mechanism is identical with that shown in Figs. 1 to 7, inclusive, the operation of wiping out being the same, except that the spur-wheel 50 is rotated for that purpose, and its shaft 52 is moved inward through the medium of the button or head 53 and the spur-wheel rotated for actuating the mechanism, as previously explained, instead of drawing outward upon a tape. The construction shown in Figs. 8 and 9 is especially adapted for use in measuring lumber, since the spur-wheel can be placed in engagement with the piece of lumber to be measured and the device simply moved along over the piece of lumber, when the length thereof will be registered and indicated through the openings 54 of the casing.

Having thus described my invention, what I claim, and desire to secure by Letters Patent, is—

1. A device of the character described, comprising a registering mechanism including a units and a tens gear, the said gears situated in different planes, and a rotatable and laterally-movable actuating-gear adapted to be brought into engagement respectively and independently with the said gears, substantially as described.

2. A device of the character described, comprising a registering mechanism including a units and a tens gear located in different planes, the tens-gear being cut away for the purpose described, and a rotatable and laterally-movable gear normally in contact with the units-gear, and adapted to be moved into engagement with the tens-gear, substantially as described.

3. A device of the character described, comprising a rotatable and laterally-movable actuating-gear, a registering mechanism including a units, a tens and a hundreds gear located concentrically around the actuating-gear and adapted to be engaged thereby, the units-gear located in a different plane from the plane in which the tens and hundreds gears are located, the tens and hundreds gears being partially cut out for the purpose described, means for normally holding the actuating-gear normally in engagement with the units-gear, and means for moving the actuating-gear laterally in engagement with the tens and hundreds gears, substantially as described.

4. A device of the character described, including a rotatable and slidable shaft carrying an actuating-gear, the shaft projecting beyond the outer face of the case, for the purpose described, a registering mechanism including a units and a tens gear, the said gears located in different planes, yielding means for normally holding the actuating-gear in engagement with the units-gear, but permitting the actuating-gear to be carried into engagement with the tens-gear, substantially as described.

In testimony whereof I have hereunto set my hand in the presence of two subscribing witnesses.

FRANK S. BALDWIN.

Witnesses:
CHAS. E. WEEKS,
WM. A. DRABBLE.